(12) United States Patent
Garg et al.

(10) Patent No.: US 10,327,201 B2
(45) Date of Patent: Jun. 18, 2019

(54) MESH NETWORK SELECTION AND ANTENNA ALIGNMENT

(71) Applicant: Parallel Wireless, Inc., Nashua, NH (US)

(72) Inventors: Sumit Garg, Hudson, NH (US); Rajesh Kumar Mishra, Westford, MA (US); Gaurav Kumar, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 15/351,914

(22) Filed: Nov. 15, 2016

(65) Prior Publication Data

US 2017/0064621 A1 Mar. 2, 2017

Related U.S. Application Data

(63) Continuation of application No. 14/290,280, filed on May 29, 2014, now abandoned.

(60) Provisional application No. 61/828,508, filed on May 29, 2013.

(51) Int. Cl.
*H04W 48/18* (2009.01)
*H04W 48/16* (2009.01)
*H04W 84/18* (2009.01)

(52) U.S. Cl.
CPC ......... *H04W 48/18* (2013.01); *H04W 48/16* (2013.01); *H04W 84/18* (2013.01)

(58) Field of Classification Search
CPC ..... H04W 48/16; H04W 48/18; H04W 84/18; H01Q 1/1257; H01Q 3/08; H01Q 1/125; H01Q 1/3275; H01Q 3/04
See application file for complete search history.

(56) References Cited

U.S. PATENT DOCUMENTS

| 6,216,266 | B1* | 4/2001 | Eastman | H04N 5/44513 348/570 |
| 8,615,603 | B2* | 12/2013 | Inada | H04W 84/12 709/240 |
| 9,078,286 | B1 | 7/2015 | Yuan et al. | |
| 9,521,378 | B1* | 12/2016 | Palaganas | H04N 7/20 |
| 9,641,237 | B2 | 5/2017 | Akhtar et al. | |
| 2002/0032028 | A1* | 3/2002 | Kaupe | H04B 7/18519 455/427 |
| 2005/0003873 | A1* | 1/2005 | Naidu | H01Q 1/125 455/575.7 |

(Continued)

*Primary Examiner* — Steven H Nguyen
(74) *Attorney, Agent, or Firm* — Michael Y. Saji; Keyur Parikh; David W. Rouille

(57) ABSTRACT

In this invention we disclose methods of automatically configuring a wireless node when it initially powers on and seeks to integrate into an existing wireless network. The wireless node could be part of an ad hoc, software defined network. One such network could be LTE network. The auto-configuration methods disclosed herein can be executed on wireless nodes throughout their operation. In addition, the methods herein allow a node to intelligently choose which network to join when there is more than one available network. In alternate embodiments, the methods disclosed could be used to create a new configuration based on changed environmental conditions, location or node capability change. These embodiments allow wireless nodes to migrate to better quality connections if they become available.

17 Claims, 3 Drawing Sheets

(56) References Cited

U.S. PATENT DOCUMENTS

| | | | |
|---|---|---|---|
| 2006/0083186 A1 | 4/2006 | Handforth et al. | |
| 2007/0030809 A1 | 2/2007 | Dayama | |
| 2007/0066233 A1* | 3/2007 | Smith | H01Q 1/1257 |
| | | | 455/67.11 |
| 2007/0070959 A1* | 3/2007 | Almeroth | H04W 40/28 |
| | | | 370/338 |
| 2007/0173259 A1* | 7/2007 | Akihara | H04W 24/02 |
| | | | 455/446 |
| 2009/0310528 A1* | 12/2009 | Tamura | H04L 63/08 |
| | | | 370/315 |
| 2010/0279616 A1* | 11/2010 | Jin | H04W 16/28 |
| | | | 455/62 |
| 2013/0017792 A1* | 1/2013 | Miller, II | H04W 16/14 |
| | | | 455/62 |
| 2013/0149970 A1* | 6/2013 | Durick | H04W 24/02 |
| | | | 455/67.11 |
| 2013/0271319 A1* | 10/2013 | Trerise | H01Q 1/125 |
| | | | 342/359 |
| 2013/0303145 A1* | 11/2013 | Harrang | H04B 7/2606 |
| | | | 455/418 |
| 2014/0206368 A1 | 7/2014 | Maltsev et al. | |
| 2014/0248925 A1* | 9/2014 | Norman | H04W 24/02 |
| | | | 455/561 |
| 2016/0050570 A1 | 2/2016 | Pace et al. | |

* cited by examiner

MESH NETWORK SELECTION AND ANTENNA ALIGNMENT

CROSS-REFERENCE TO RELATED APPLICATIONS

This application is a continuation of, and claims benefit of an earlier filing date under 35 U.S.C. § 120 based on, U.S. patent application Ser. No. 14/290,280, filed May 29, 2014, entitled "Intelligent Mesh Network Selection," which itself claims priority to the following U.S. Provisional patent Applications, all of which are entitled "Directional Antenna Optimization for Base Station," No. 61/828,508 filed May 29, 2013; U.S. Provisional Patent Application No. 61/839,496, filed Jun. 26, 2013; and U.S. Provisional Patent Application No. 61/926644, filed Jan. 13, 2014, the entire contents of which are hereby incorporated by reference. U.S. patent application Ser. No. 14/289,821 entitled "Method of Connecting Security Gateway to Mesh Network", filed May 29, 2014 is incorporated herein by reference in its entirety for all purposes.

FIELD

The present invention relates generally to wireless multimedia telecommunications. More specifically, this invention relates to the initial configuration of a multi-radio access node and methods for it to intelligently select a mesh network to join when there is more than one available.

BACKGROUND

The initial configuration and set up of a new multi radio access node within a network can be a time consuming, and, therefore, expensive endeavor. Presently, nodes are preconfigured to join a certain network. One example of pre-configuration is evident when a particular node is pre-configured to attach to a network having a particular SSID or a set of possible SSIDs.

In the context of pre-configuring a node, hardware specifications affect the pre-configuration specifics. One example of a hardware feature that can affect network configuration is the antennas on the multi radio access node. If the multi access radio node is equipped with omni-directional antennas for all available radio technologies, these antennas will be able to hear all mesh networks within their range when they are powered on. Said differently, a multi radio access node using strictly omni antennas can determine which networks are within its range for each of the radio technologies it can support because omni antennas can receive signals from all available networks over a 360-degree azimuthal plane. This aspect of omni-directional antennas makes them very attractive.

One drawback, however, of including omni-directional antennas as part of a multi-radio access node's hardware is—the transmit power regulations placed upon omni-directional antennas are more stringent than they are for directional antennas. This results in a shorter range for omni-directional antennas, and necessarily a smaller coverage area for the node. To overcome this shortcoming, network designers often equip wireless nodes with directional antennas. These antennas have an increased range, higher power limitations, and therefore a greater coverage area. The drawback of using directional antennas in a network is the increased time and cost of installing the multi-radio access node so that the directional antenna is properly aligned to pre-determined azimuth and elevation angles, which are calculated to enhance a particular network's coverage area. This drawback is particularly acute if a wireless node has more than one directional antenna. Additionally, when network conditions change, directional antennas with a fixed physical configuration are unable to independently realign themselves in order to provide optimal wireless coverage.

In the situation where there are numerous networks available for a wireless node to join, it would be advantageous for the node to be able to intelligently choose among the available networks, as opposed to being hamstrung by its pre-configuration. This point can be illustrated with reference to FIG. 1. Let's assume that wireless node 100 recently came on line at a location where there were two available networks 122 and 132 that it could join. As an initial matter, wireless node 100 may come on line and make a connection with security gateway 120 and security gateway 130. In the prior art, wireless node 100 may then exchange information with security gateways 120 and 130. This information exchange could include authentication credentials, security protocols, and additional configuration information not pre-programmed into wireless node 100.

This scenario assumes that antennas 102 and 104 can connect with antennas located at security gateways 120 and 130. If antennas 102 and 104 are omni-directional, this presumption would hold true, assuming security gateways 120 and 130 were within range of antennas 102 and 104. Similarly, the presumption holds true if antennas 102 and 104 are directional so long as their azimuth and elevation angles are properly aligned with antennas at security gateways 120 and 130. If directional antennas 102 and 104 are not preconfigured to a proper azimuth and elevation angle with respect to security gateways 120 and 130, wireless node 100 would not even know that it was within range of wireless networks 122 and 132.

It is therefore desirable to develop a method of overcoming these shortcomings. It is also advantageous to facilitate an intelligent choice of network both at the initial installation phase and throughout the operational life of the node.

SUMMARY OF THE INVENTION

In this invention we disclose methods for allowing a multi-RAT node to intelligently choose which mesh network to join when there is more than one mesh network available. The configurations of the available mesh networks in different embodiments could change. For example, in one embodiment, the available mesh networks could be stand-alone mesh networks. In a second embodiment, the mesh networks could be mesh networks having core network connectivity via a backhaul connection. In a third embodiment, the mesh networks could be connected to the core via a security gateway or a gateway node that is part of the mesh network. For a more detailed description of a gateway node being part of a mesh network, see U.S. patent application Ser. No. 14/289821, filed on May 29, 2014, entitled "Method of Connecting Security Gateway to a Mesh Network," the entire contents of which are hereby incorporated by reference. In alternate embodiments, the available networks could be any combination of the above-described networks.

In terms of making an intelligent choice between the available networks, the methods described herein use selection criteria specific to each available network in order to decide which network to join. Examples of selection criteria are, without limitation: SSID, BSSID, Operator ID, private information element, information element, HESSID, RSSI for mesh network, gateway cost for mesh network, network load, network capacity, guaranteed bit rate, a hysteresis for multiple mesh nodes within a network, excluded nodes, preferred nodes, nodes that have experienced an authentication failure, and the like.

GLOSSARY

ANQP means access network query protocol.

BSSID means basic server set identifier, which can identify a specific access point or node.

GAS means generic advertisement services.

GBR means guaranteed bit rate.

HESSID means homogeneous extended service set identifier.

IE means information element.

MCC means mobile country codes.

MNC means mobile network codes.

Multi-RAT node means a multi-access radio technology node.

RSSI means received signal strength indication.

SSID means service set identifier, which can be a network name.

DETAILED DESCRIPTION

When a multi-radio access technology node is initially powered up at a new location, it will seek to join a network within its range. This is true whether the node is manually configured to join an available network, or preprogrammed to automatically join available networks within its range. As previously discussed, most typically multi-radio access nodes are preprogramed with a set of criteria that allow the node to find the network to which it was intended by the network operator to connect. Part of the preprogrammed information also allows the node to authenticate itself with the preexisting network and to integrate itself into the preexisting network.

One of the drawbacks of this method of adding a new node to an existing network is a lack of flexibility attendant to the requirement for advanced preprogramming. In the situation where network operating conditions have changed from the time that the node was preprogrammed at the factory, the node could be installed and configured in a less than optimal way. One of the benefits of this invention is the reduction in advanced planning and preprogramming. The reduced reliance on preprogramming facilitates flexibility and optimization in network configuration.

The embodiments described herein can be equally effective at enhancing network flexibility and optimization for nodes after they have been installed. Said differently, the methods described herein can also be performed for any and all nodes within a mesh network throughout the time that they are operational. In this way, multi-access radio nodes can periodically scan their environment and make intelligent selections as to which network to join based on real-time conditions. As those skilled in the art will recognize, wireless network conditions can change rapidly. This invention therefore allows for seamless, efficient wireless mesh operation in an environment of changing network dynamics.

Figure 1:
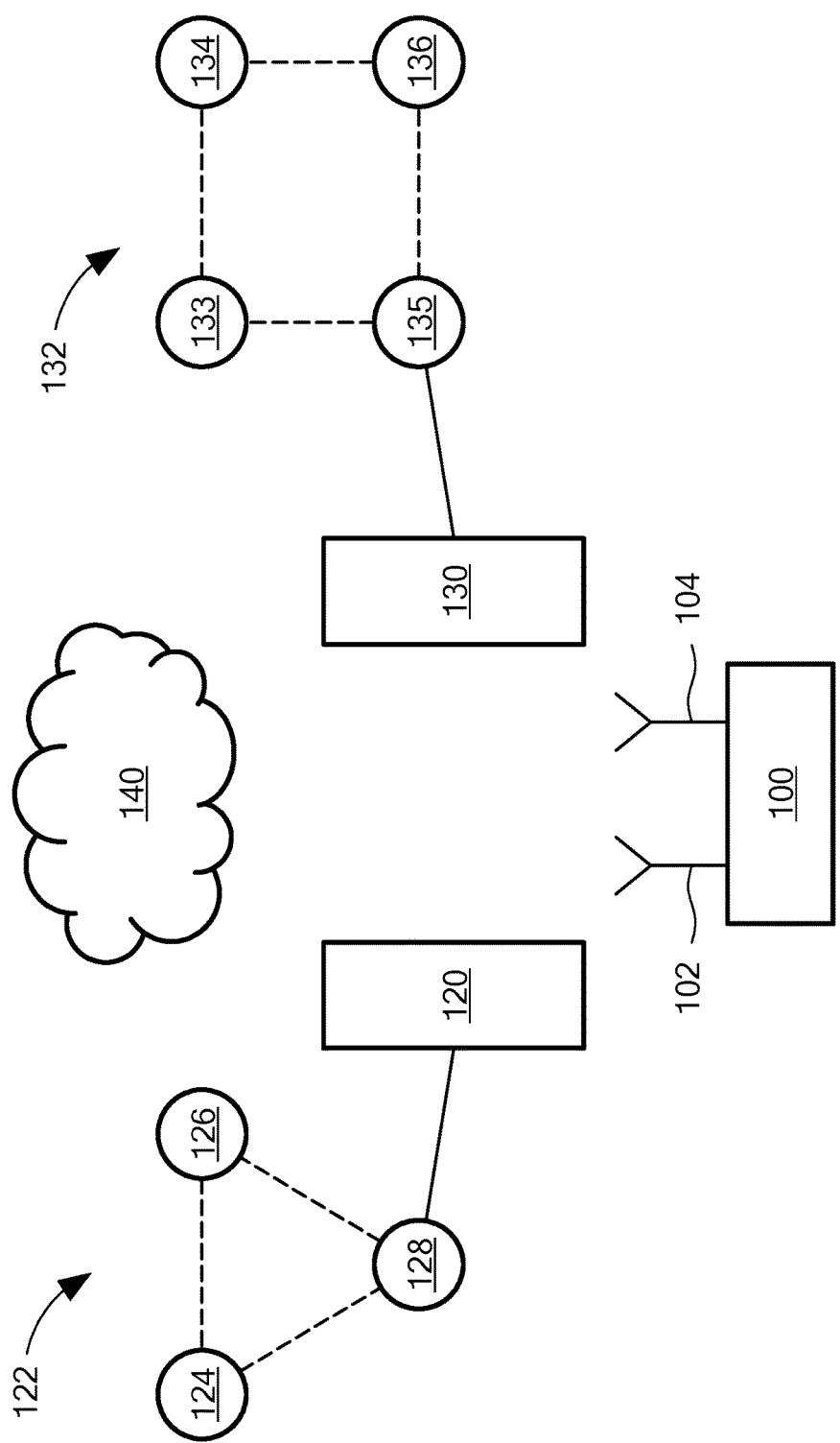
FIG. 1 is a diagram of a wireless network upon which methods of the present invention may be implemented.
Figure 2:
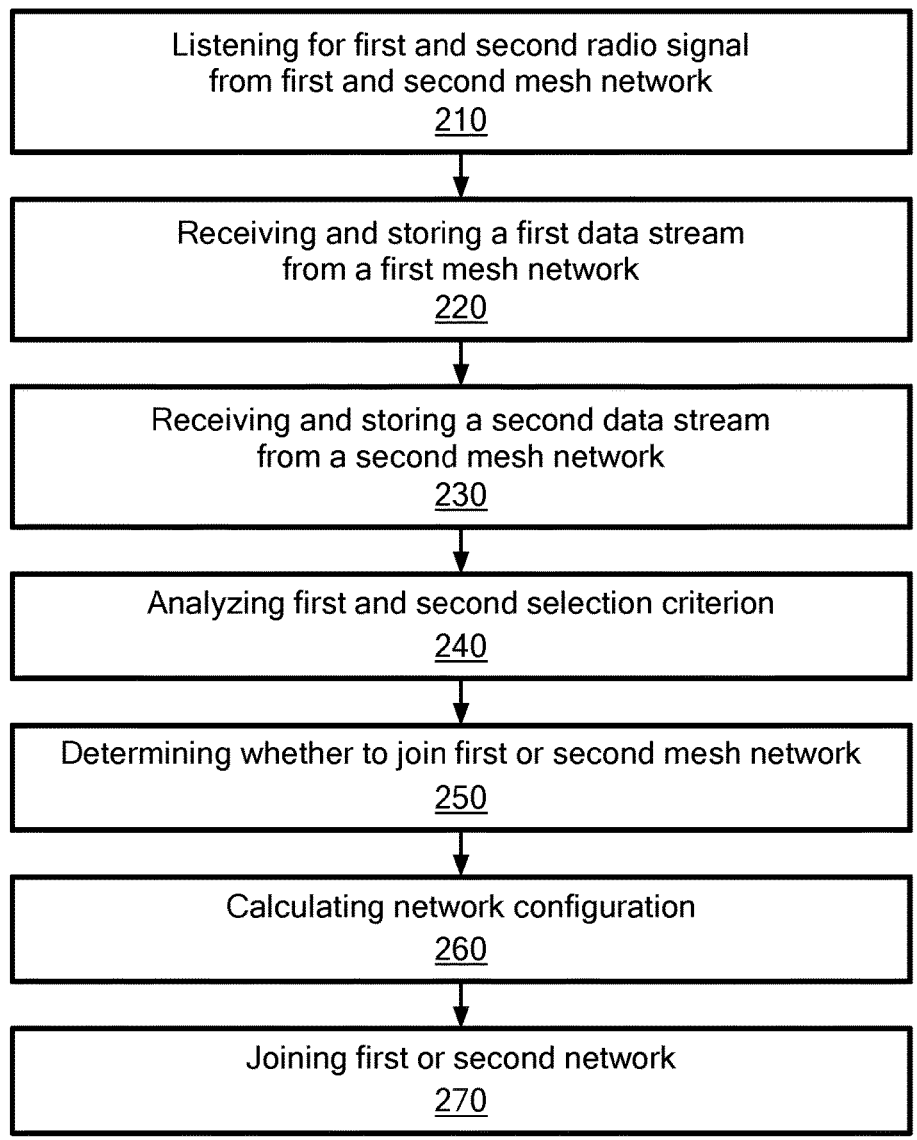
FIG. 2 is a flowchart showing steps of a method of selecting a mesh network to join when there is more than one available mesh network.

FIG. 2 shows method steps for a node seeking to join a mesh network wherein the mesh network does not rely on analysis or input from a computing cloud. In this embodiment, when a multi-access radio 100 performs these method steps it listens 210 for a first and second radio signal from a first 122 and second mesh network 132. This signal could be transmitted from security gateway 120 or 130, or it could come from any one of the multi-radio access nodes 124, 126, 128, 133, 134, 135, or 136. Similarly, any one of the multi-access radio nodes 124, 126, 128, 133, 134, 135, or 136, in alternate embodiments, could be a gateway node. If the multi-radio access node 100 hears a radio signal from a first mesh network 122, it receives and stores 220 a first data stream from the first mesh network 122. If the multi-radio access node 100 hears a radio signal from a second mesh network 132, it receives and stores 230 a second data stream from the second mesh network 132.

Once the multi-radio access node has more than one available mesh network from which it can choose, it must then set about making an intelligent choice as between the two available networks. In one embodiment, the multi-radio access node can analyze 240 a first and second selection criterion that is part of the first and second data streams to choose between the available networks. Some examples, without limitation, of selection criteria are: SSID, BSSID, Operator ID, private information element, information element, HESSID, RSSI for mesh network, gateway cost for mesh network, network load, network capacity, guaranteed bit rate, a hysteresis for multiple mesh nodes within a network, excluded nodes, preferred nodes, nodes that have experienced an authentication failure, and the like.

In terms of analyzing the selection criterion, in one embodiment, multi-RAT nodes could have a list of identifying information for networks that it could join. Identifying network information could be SSIDs corresponding to the list of networks the multi-RAT node has authentication credentials to join, BSSID, Operator ID, private information element, information element, HESSID, and the like. In embodiments having a cloud component, these network identifying credentials could be updated dynamically by the computing cloud. In some embodiments, multi-RAT nodes could contain many SSIDs to enhance the likelihood that the node will detect a mesh network to which it can attach. In an additional embodiment, if multiple networks with the same ID are detected, BSSID could be used as a selection mechanism for determining whether a network having that BSSID should be considered an available network for the multi-RAT node to join.

In an alternate embodiment, beacon frames, which are part of the data stream received from the first or second mesh networks, could have a vendor specific information element IE included therein. This vendor specific information element could be a unique identifier for each network operator. The initial burn-in performed on the multi-RAT node before it is installed could have this unique IE instead of an SSID list. In this embodiment, the multi-RAT node could try to mesh with all nodes advertising the unique IE, irrespective of the SSID in use. In this way, two different operators SSID's could overlap without there being any issues.

In alternate embodiments, the decision about which network to join could be made based upon current network conditions such as: RSSI for mesh network, gateway cost for the mesh network, network load, network capacity, guaranteed bit rate, a hysteresis for multiple mesh nodes within a network, excluded nodes, preferred nodes, nodes that have experienced an authentication failure, and the like.

After determining 250 which network to join, the multi-RAT node uses an internal processor to calculate 260 a network configuration for the network of choice. The multi-RAT node then adopts the calculated configuration and joins 270 the network of choice.

Figure 2A:
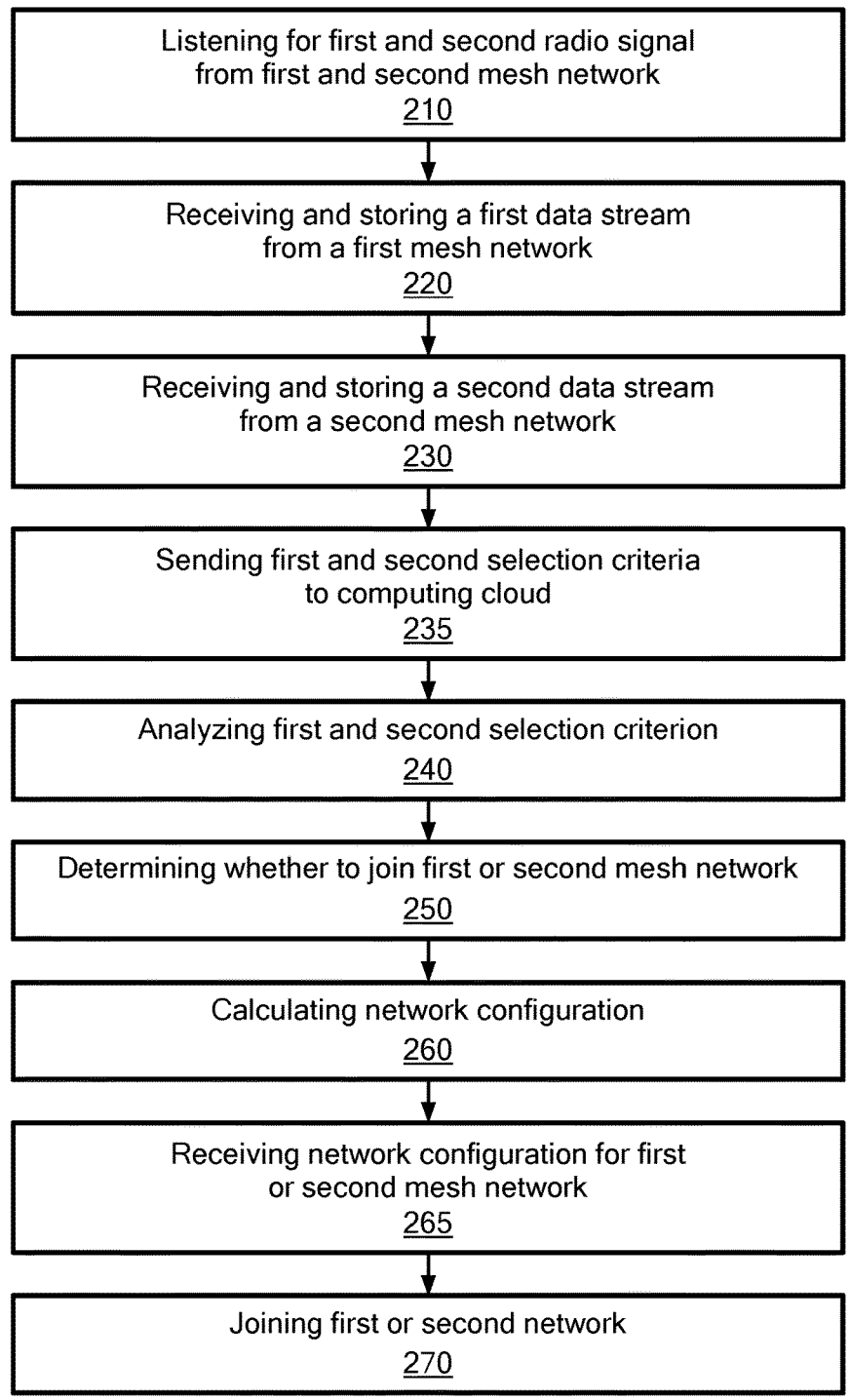
FIG. 2A is flowchart showing steps of a method of selecting a mesh network when there is more than one mesh network to join wherein a computing cloud component is a part of the embodiment.

In an alternate embodiment, the choice of which available network to use could be made by a computing cloud 140 component. This embodiment is shown with reference to FIG. 2A. According to this embodiment, first and second selection criterion are sent 235 to a computing cloud 140 component. These first and second selection criteria are obtained by listening 210 for a first and second radio signal from a first and second mesh network; receiving and storing 220 a first data stream from a first mesh network; and receiving and storing 230 a second data stream from a second mesh network. The multi-RAT node 100 then sends 235 the first and second selection criterion to the computing cloud 140.

Once the computing cloud 140 receives the first and second selection criterion, processors within the computing cloud 140 analyze 240 the first and second selection criterion to determine 250 which of the two networks 122, 132 the multi-RAT node 100 should join. A processor within the computing cloud then calculates 260 network configuration and sends that network configuration to the multi-RAT node 100. Once the multi-RAT node 100 receives 265 the network configuration for the network of choice, it joins 270 the first or second network.

When new base stations, called mesh RANs throughout, are installed, it can be a time-consuming, and therefore expensive, process to test and align the antennas. Presently, antenna alignment is done manually. After the antennas are initially aligned, the installation crew performs a test to determine if the alignment is proper. Proper alignment is a function of antenna power, radiation pattern, interference from other antennas, and the topography/geography of the antenna's location.

In outdoor, long distance, multi-radio mesh networks it can be very difficult to point directional antennas to achieve maximum connectivity and range. This difficulty is compounded each time an additional antenna is added to the mesh RAN. In addition, if the distribution of mesh RANs is non-uniform, the difficulty of properly position antennas to achieve maximum connectivity and range is heightened.

Once the system has been optimized, it may not stay that way forever. For example, the interference pattern could change if another antenna begins to transmit in the vicinity of the mesh RAN. Another example may be a changing topological profile if a building is constructed or demolished within the mesh RAN's range. In these situations and others that those skilled in the art will recognize, it would be necessary to manually readjust the antennas. Even if the antennas are attached to a motor that could be controlled remotely, readjusting them would still require human oversight.

It is therefore desirable to implement automated processes for initializing and maintaining the optimum positioning of antennas on a mesh RAN.

The automatic positioning and orientation of antennas on mesh-RANs is performed in custom-made software modules using self-organizing network "SON" techniques. Some of these SON modules are discussed in detail in U.S. Patent Application Nos. 61/705440 entitled "Multi-Access and Backhaul Wireless Systems and Methods," 61/725865 entitled "Novel method of location based PCI selection in radio networks," 61/729158 entitled "Dynamic Frequency Selection Using SON, UE Location and Power Information," 61/729489 entitled "Dynamic Discovery of Uni-Cloud Node by Uni-RAN," 61/783193 entitled "Automatic Access And Backhaul Role Switch for Networking Resources," 61/793351 entitled "Start-up sequence and configuration for radio node" and Ser. No. 13/889631 entitled "Heterogeneous Mesh Network and a Multi-RAT Node Used Therein," the contents of which are hereby incorporated by reference.

Upon installation, the mesh RAN can use GPS, electric or magnetic field sensors, and/or a gyroscope to assist in properly orienting the antenna. Embodiments of this invention provide visual or audible feedback to installation personnel to aid in the installation process. This method could be an app on a smart phone or PDA in alternate embodiments.

Phased Array Antenna Optimization occurs once a mesh RAN has been installed, continued optimization of antenna orientation can be performed using custom-made self-organizing network "SON" modules. A typical mesh RAN has several antennas because mesh RANs support communication over many different frequency bands. Rather than using motors to adjust the orientation of each of these antennas, the SON modules of the present invention work together with phased array antennas. According to this embodiment, a mesh RAN could calibrate its antenna orientation by communicating with a neighboring mesh RAN. The mesh RAN seeking to calibrate could, one by one, establish a connection with the same type of antenna on the neighboring mesh RAN. The mesh RAN under calibration could transmit a test sequence of 100 data packets. The neighboring antenna will also have a copy of the test sequence so that if can determine what was received and what was lost. The existing mesh RAN can then transmit the test sequence to the new mesh RAN. In this way, the two mesh RANs work together adjusting the beam width of the phased array until an optimal state is attained.

In this embodiment, a software module, which can be internally stored within a mesh RAN or could be an app on a smart phone, PDA or the like, is coupled to a GPS, or a magnetic field sensor, or a gyroscope. This embodiment can have internet connectivity as well. Installation Assistance Device will be placed at a fixed location on mesh RAN and will connect to remote server(s) with any available means. Information received from sensors is fed into the application which then process the data and communicates the processed information to remote server(s). Remote server(s) based on its knowledge of neighborhood network finds the optimal coverage and connectivity for this node. Cloud sends the details regarding the node and their respective locations to the application. Application then determines the direction of each antenna to be placed. As these antenna are not very flexible and might be pasted on the device itself, application considers these factors as well and finds optimal orientation for device deployment. Once this information is acquired application sensors will be used to provide user/installer with visual/audible aid by moving the device installed with application. Sensor data will help to find the location, direction, orientation of the device etc. This information will be used to provide optimal installation height/direction/vertical alignment etc. for the mesh RAN. There might be iteration of above process to achieve fine tuning of network. Also user may opt not to go for further iteration of process. Once Installed the Installation assistance device will update server with its final details in terms of location/ height/direction/direction of antenna/orientation etc. so that this information can be used by server for future.

The invention can be a method of automatically adjusting the beam-width of a phased-array antenna within a mesh network, comprising the steps of: transmitting a known signal from a first mesh node to a second mesh node; storing a received signal in a memory device of the second node; comparing the stored received signal to the known signal in order to determine how much of the known signal was received by the second node; calculating a beam adjustment value; storing the beam adjustment value in the memory device of the second node; and transmitting the beam adjustment value to the first node.

The invention could further include the steps of: transmitting the known signal from the second mesh node to the first mesh node; storing a second received signal in a memory device of the first node; comparing the stored second received signal to the known signal in order to determine how much of the known signal was received by the first node; calculating a second beam adjustment value; and storing the second beam adjustment value in the memory device of the first node.

Another method could be to determine a directional parameter for an antenna, which could include the steps of: connecting to a remote server in order to transmit location information to the remote server; receiving information regarding a directional parameter for an antenna from the remote server; storing the directional parameter in a memory device coupled to a sensor; and using the sensor to determine when the location of the antenna coincides with the directional parameter.

The foregoing discussion discloses and describes merely exemplary embodiments of the present invention. In additional embodiments, the methods described herein can be stored on a computer readable medium such as a computer memory storage, a compact disk (CD), flash drive, optical drive, or the like. Further, the computer readable medium could be distributed across memory storage devices within multiple servers, multi-RAT nodes, controllers, computing cloud components, mobile nodes, and the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

What is claimed is:

1. A system for providing coverage and connectivity to a plurality of mobile devices, comprising:
    a multi radio access technology (multi-RAT) node, configured to:
       detect an identifier of a mesh network from a plurality of mesh networks, and receive a message identifying a selected mesh network together with the location of a mesh network node of the selected mesh network node and a network configuration for the mesh network node of the selected mesh network;
    a remote server, configured to:
       select the selected mesh network from the plurality of mesh networks to join based on the detected identifier and at least one network performance criterion; and
    an installation assistance device with a connection to the Internet, configured to:
       receive sensor input from at least one sensor physically located on the multi-RAT node;
       receive coverage configuration and connectivity configuration from the remote server corresponding to a desired coverage and connectivity pattern; determine orientation and position of multi-RAT node corresponding to the desired coverage and connectivity pattern; and
       provide visual or auditory feedback to an operator to enable the operator to physically position the multi-RAT node according to the determined orientation and position.

2. The system of claim 1, wherein the at least one sensor is a global positioning system (GPS), a magnetic field sensor for assessing radio frequency signal strength, or a gyroscope.

3. The system of claim 1, wherein the installation assistance device is a smartphone or personal digital assistant (PDA).

4. The system of claim 1, wherein the remote server is a self-organizing network (SON) coordination server containing information about other base stations in the vicinity of the multi-RAT node, and the information about the topological profile in the vicinity of the multi-RAT node.

5. The system of claim 1, wherein the multi-RAT node further comprises at least one directional antenna, and wherein the visual or auditory feedback is also provided to enable the operator to physically position the at least one directional antenna.

6. The system of claim 1, wherein the visual or auditory feedback is provided continuously to the operator as the operator moves the device, and wherein the visual or auditory feedback is based on the received sensor input.

7. The system of claim 1, where the installation assistance device is further configured to update the remote server with final location, height, and antenna orientation of the multi-RAT node and its antennas.

8. The system of claim 1, wherein the identifier of the mesh network is an Wi-Fi service set identifier (SSID).

9. The system of claim 1, wherein the network performance criterion is at least one of network load, network capacity and gateway cost.

10. A method for providing coverage and connectivity to a plurality of mobile devices, comprising:
    detecting, at a multi radio access technology (multi-RAT) node, an identifier of a mesh network from a plurality of mesh networks;
    selecting, at a remote server, the mesh network from the plurality of mesh networks to join based on the detected identifier and a network performance criterion;
    receiving, at an installation assistance device, a sensor input from at least one sensor physically located on the multi-RAT node;
    receiving, at the installation assistance device, coverage configuration and connectivity configuration from a remote server corresponding to a desired coverage and connectivity pattern;

determining, at the installation assistance device, orientation and position of multi-RAT node corresponding to the desired coverage and connectivity pattern; and providing, at the installation assistance device, a visual or auditory feedback to an operator to enable the operator to physically position the multi-RAT node according to the determined orientation and position.

11. method of claim 10, wherein the at least one sensor is a global positioning system (GPS), a magnetic field sensor for assessing radio frequency signal strength, or a gyroscope.

12. The method of claim 10, further comprising continuously providing visual or auditory feedback to the operator as the operator moves the device and based on the received sensor input.

13. The method of claim 10, further comprising updating the remote server with final location, height, and antenna orientation of the multi-RAT node and its antenna.

14. The method of claim 10, wherein the network performance criterion is at least one of network load, network capacity and gateway cost.

15. The method of claim 10, further comprising selecting, at the remote server, the mesh network from the plurality of mesh networks to join based on at least one of BSSID, Operator ID, private information element, information element, HESSID.

16. The method of claim 10, further comprising selecting, at the remote server, the mesh network from the plurality of mesh networks to join based on at least one of: a RSSI for mesh network, a guaranteed bit rate, and a hysteresis for mesh nodes within the mesh network.

17. The method of claim 10, further comprising selecting, at the remote server, the mesh network from the plurality of mesh networks to join based on at least one of: preferred mesh nodes, excluded mesh nodes, and authentication failure statistics.

* * * * *